United States Patent [19]

Collard

[11] Patent Number: 5,556,487
[45] Date of Patent: Sep. 17, 1996

[54] TRACK DEVICE HAVING WHEEL WIDENING EFFECT

[75] Inventor: Bruno Collard, Lattérière, Canada

[73] Assignee: Soudures et Chaines Pedno Inc., Canada

[21] Appl. No.: 404,052

[22] Filed: Mar. 14, 1995

[30] Foreign Application Priority Data

Jan. 27, 1995 [CA] Canada ................................. 2141239

[51] Int. Cl.$^6$ ................................................. B60C 27/20
[52] U.S. Cl. ........................ 152/228; 152/179; 152/183; 152/187
[58] Field of Search .................................... 152/169, 170, 152/178, 179, 180, 182, 183, 185, 185.1, 187, 188, 190, 191, 225 R, 226, 227, 228, 229, 230; 305/19, 39

[56] References Cited

U.S. PATENT DOCUMENTS

| 1,234,896 | 7/1917 | Hadnagy | 152/225 R |
|---|---|---|---|
| 2,433,435 | 12/1947 | Cook | 152/225 R |
| 2,433,436 | 12/1947 | Cook | 152/225 R |
| 2,666,469 | 1/1954 | Dasch | 152/226 X |
| 2,917,095 | 12/1959 | Galanot | 152/225 R |
| 2,936,807 | 5/1960 | Hajart | 152/225 R |
| 3,601,212 | 8/1971 | Peterson | 152/182 X |

Primary Examiner—Michael W. Ball
Assistant Examiner—Francis J. Lorin
Attorney, Agent, or Firm—Lee, Mann, Smith, McWilliams, Sweeney & Ohlson

[57] ABSTRACT

A track device for mounting on a pneumatic tire fitted to the wheel of a vehicle to improve the buoyancy and traction of the vehicle over very soft terrain, the pneumatic tire including a tread surface across the width of the tire, a pair of side walls and an axis of rotation. The track device includes a plurality of bridge-like longitudinal and rigid traction blades having an inside surface made to rest on the tire across the width of the tread surface and a ground engaging outside surface, the traction blades being disposed on the tire in generally closely spaced-apart and parallel relationship to form an endless track. Each traction blade includes an intermediate bridge-like portion made to conform to the general cross-sectional shape of the tire, essentially flat side portions outwardly projecting from either side of the intermediate portion and generally parallel to the axis of rotation of the tire. The side portions sufficiently project beyond the width of the tire so as to provide a widening of the wheel of at least twenty percent of the width of the tire, thereby increasing the buoyancy and traction of the vehicle over very soft and muddy. Additional side members, integral with the traction blade are adapted to rest against the side walls of the tire so as to maintain the traction blade positioned over the tire. U-shaped linking members are provided for interconnecting the traction blades so that the traction blades form a tight track around the tire.

5 Claims, 4 Drawing Sheets

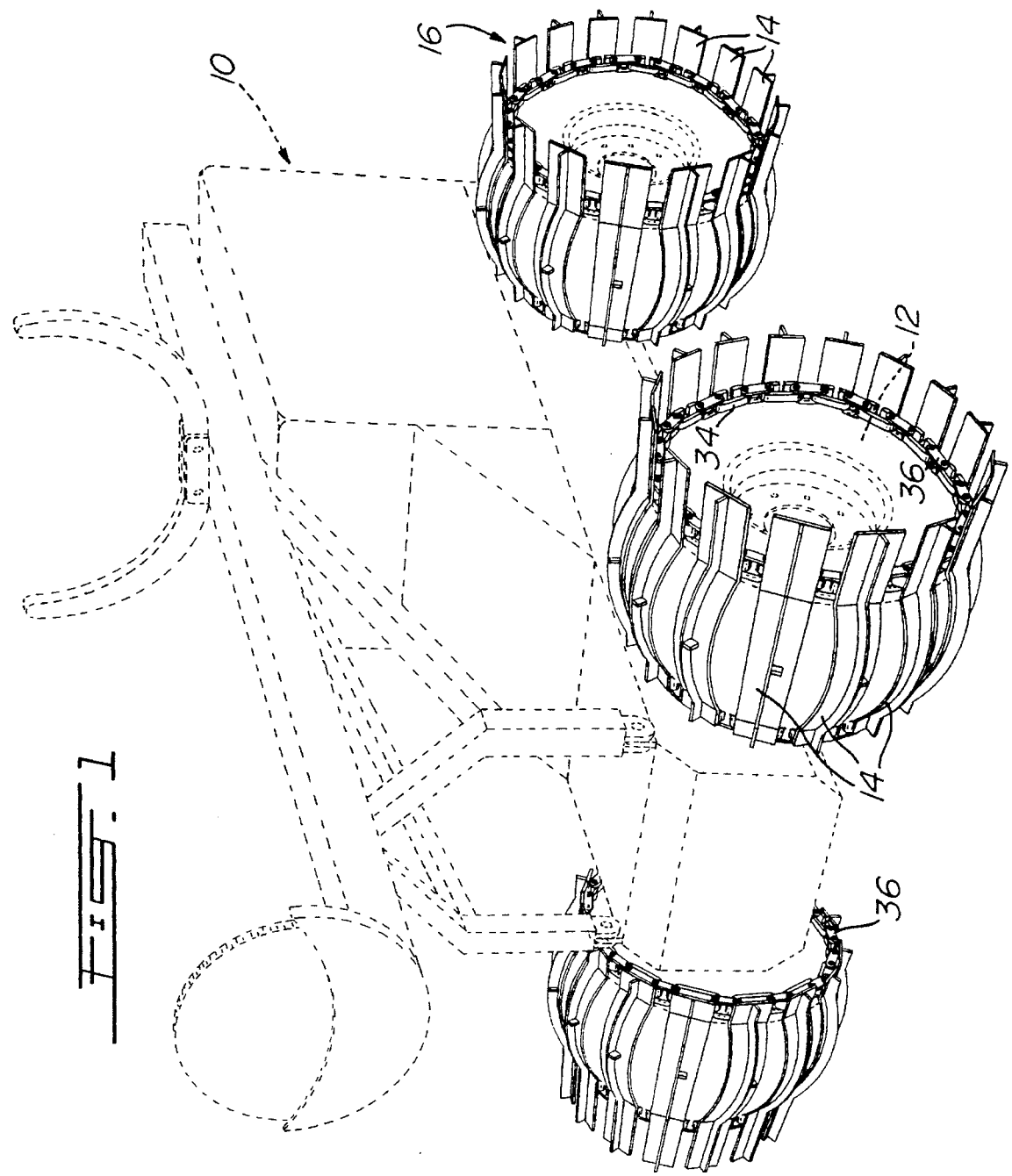

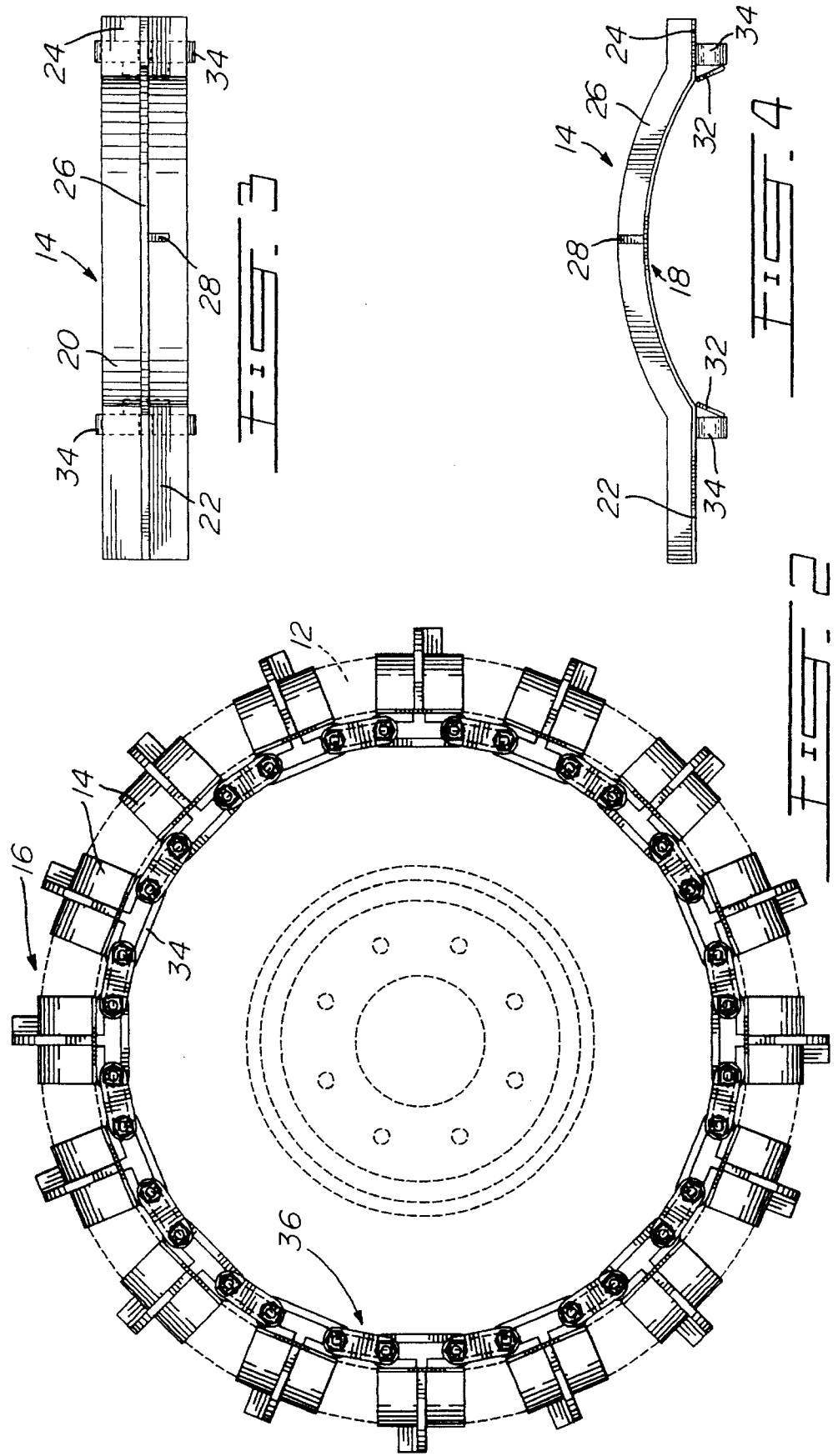

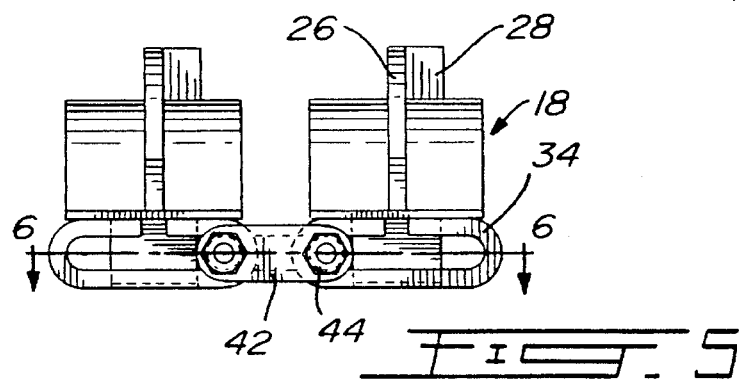
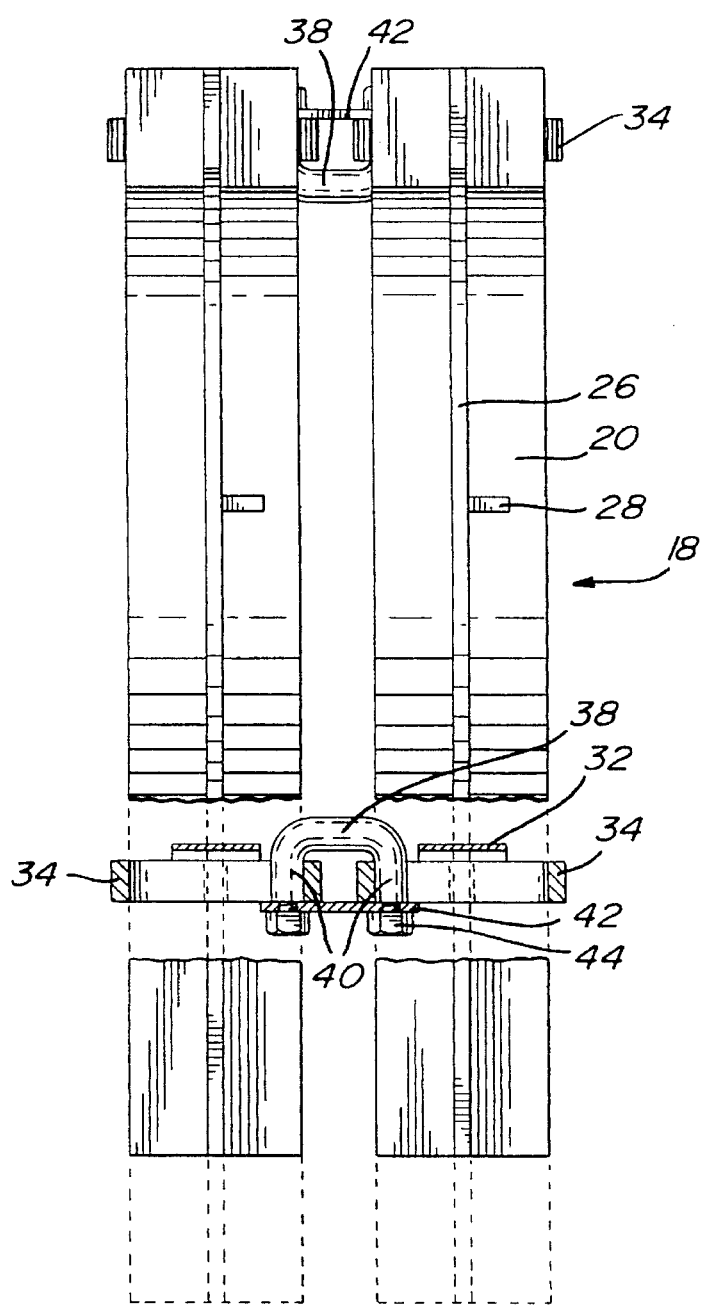

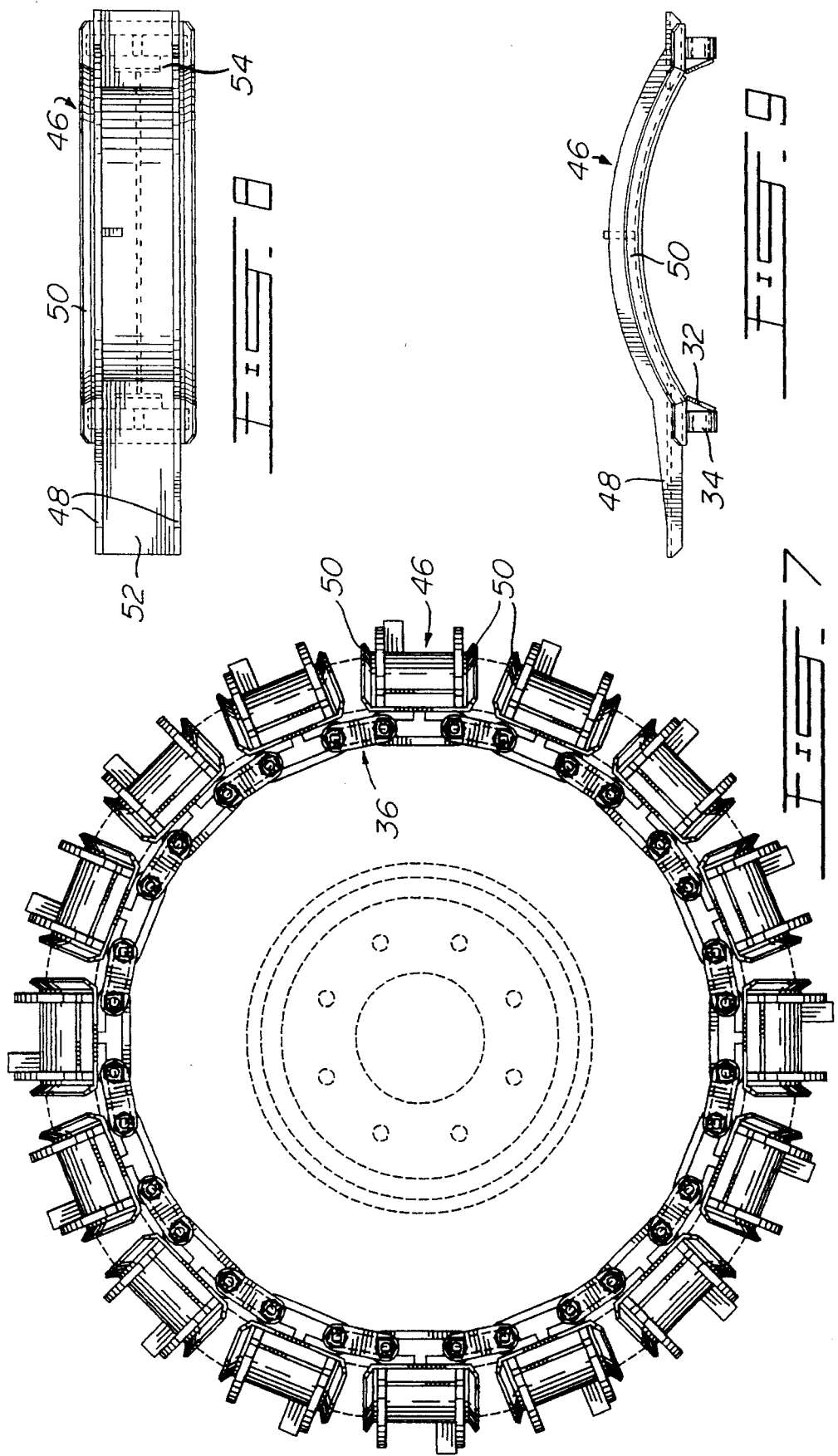

TRACK DEVICE HAVING WHEEL WIDENING EFFECT

BACKGROUND OF THE INVENTION

1. Field of Invention

The present invention relates to a heavy equipment traction aid device. More specifically, the present invention relates to a tire track for installation on a pneumatic tire to facilitate the movement of the equipment over very soft and muddy terrain and to improve the buoyancy of heavy equipment rolling over such terrain.

2. The Prior Art

Numerous traction aid or anti-skid devices have been proposed for retrofitting on existing pneumatic tires. These devices range from the simple ladder-like chain to more elaborate systems using, for example, a plurality of solid interconnected traction blades disposed around the periphery of the tire in a continuous track. For example, Table I below, provides exemplary prior art.

TABLE I

| | Prior Art | |
| --- | --- | --- |
| U.S. Pat. Nos. | Inventor | Year |
| 2,917,095 | Galanot | 1959 |
| 2,666,469 | Dasch | 1954 |
| 2,433,435 | Cook | 1947 |
| 2,433,436 | Cook | 1947 |
| 2,936,807 | Hajart | 1960 |
| 1,234,896 | Hadnagy | 1917 |

Traditionally these devices have been manufactured in various sizes depending on the tire to be fitted.

It is a generally accepted principle that for a vehicle of a given weight, the narrower the tires are, the more it will have a tendency to sink and get bogged down in very soft and muddy terrain. Fitting traction aids such as chains or track on the tires over narrow tires may even worsen the situation since the vehicle will still tend to sink and the traction aids will often dig the ground under the wheel and sink the vehicle even deeper. Such involuntary excavation of soft and muddy ground, for example in the course of logging operations, often causes unwanted and long term damage to the soil and the local ecosystems. The common solution for improving the buoyancy and traction of heavy equipment over very soft and muddy terrain has been to provide larger and wider tires. This results in rather lengthy equipment downtime and increased costs as wheels, tires and traction aids such as chains are changed.

There is therefore a need for an improved device for retrofitting on existing tires which will improve the traction and buoyancy of heavy equipment over very soft and muddy terrain without the need of changing the tires even though the tires would generally be considered to narrow for the given terrain conditions.

SUMMARY OF THE INVENTION

The invention provides a track device for mounting on a pneumatic tire fitted to the wheel of a vehicle to improve the buoyancy and traction of the vehicle over very soft terrain, the pneumatic tire comprising a tread surface across the width of the tire, a pair of side walls and an axis of rotation, the track device comprising: a plurality of bridge-like longitudinal traction blades having an inside surface made to rest on the tire across the width of the tread surface and a ground engaging outside surface, the traction blades being disposed on the tire in generally closely spaced-apart and parallel relationship to form an endless track; each the traction blade comprising:

an intermediate bridge-like portion made to conform to the general cross-sectional shape of the tire, essentially flat side portions outwardly projecting from either side of the intermediate portion and generally parallel to the axis of rotation of the tire, the sides portions sufficiently projecting beyond the width of the tire so as to provide a widening of the wheel of at least twenty percent of the width of the tire, thereby increasing the buoyancy and traction of the vehicle over very soft and muddy terrain, on its inside surface, side members, integral with the traction blade and adapted to rest against the side walls of the tire so as to maintain the traction blade positioned over the tire; linking means for interconnecting the traction blades so that the traction blades form a tight track around the tire;

One embodiment of the invention provides a track device for mounting on a pneumatic tire fitted to the wheel of a vehicle to improve the buoyancy and traction of the vehicle over very soft terrain, the pneumatic tire comprising a tread surface across the width of the tire, a pair of side walls and an axis of rotation, the track device comprising: a plurality of bridge-like longitudinal traction blades having an inside surface made to rest on the tire across the width of the tread surface and a ground engaging outside surface, the traction blades being disposed on the tire in generally closely spaced-apart and parallel relationship to form an endless track; each the traction blade comprising:

an intermediate bridge-like portion made to conform to the general cross-sectional shape of the tire, essentially flat side portions outwardly projecting from either side of the intermediate portion and generally parallel to the axis of rotation of the tire, the sides portions sufficiently projecting beyond the width of the tire so as to provide a widening of the wheel of at least twenty percent of the width of the tire, thereby increasing the buoyancy and traction of the vehicle over very soft and muddy terrain, on its inside surface, side members, integral with the traction blade,and adapted to rest against the side walls of the tire so as to maintain the traction blade positioned over the tire, at least one longitudinal rib element integral with the traction blade and outwardly projecting from the outer surface of the traction blade so as to provide additional traction to the track device and additional strength to the traction blade; link elements for interconnecting the traction blades so that the traction blades form a tight track around the tire, the link elements comprising:

a U-shaped member having a intermediate portion and two leg portions, the U-shaped member being adapted to link adjacent traction blades by insertion of each leg portion of the U-shaped member into a corresponding apertured member integral with the inside surface of the traction blade, a longitudinal flat member having bores in each longitudinal end adapted to receive therethru the leg portions of the U-shaped member, fastening means to fasten the longitudinal flat member to the leg portions of the U-shaped member.

Other features and advantages of the invention will become apparent to those of ordinary skill in the art upon review of the following detailed description, claims, and drawings. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 1 is a perspective view showing the device of the present invention fitted to the pneumatic tires of heavy forestry equipment shown in dotted lines;

FIG. 2 is a side elevational view of the device of the present invention fitted to the a pneumatic tire;

FIG. 3 is a top view of a traction blade of the present invention;

FIG. 4 is a side elevational view of the traction blade of FIG. 3;

FIG. 5 is a front elevational view showing two of the traction blades of FIG. 3 linked by a linking element;

FIG. 6 is a cross-sectional top view taken along line 6—6 of FIG. 5

FIG. 7 is a side elevational view of an optional embodiment of the device of the present invention fitted to the a pneumatic tire;

FIG. 8 is a top view of an optional embodiment of a traction blade of the present invention;

FIG. 9 is a side elevational view of the traction blade of FIG. 8;

DETAILED DESCRIPTION OF THE PREFERRED EMBODIMENT

Before describing the present invention in detail, it is to be understood that the invention is not limited in its application to the details of construction and parts illustrated in the accompanying drawings and described herein. The invention is capable of other embodiments and of being practiced in various ways. It is also to be understood that the phraseology or terminology used herein is for the purpose of description and not limitation.

Now referring to the drawings, more specifically to FIG. 1, there is shown in dotted lines a piece of forestry operations heavy vehicle 10. The vehicle 10 is provided with four wheels having pneumatic tires 12 (also shown in dotted lines). On each pneumatic tire 12 are mounted a plurality of bridge-like rigid traction blades 14 which form the device of the present invention generally identified as track 16. Track 16 not only improves the buoyancy and traction of vehicle 10 over very soft and muddy terrain but it also protects the tires 12 from damage.

Turning now to FIGS. 2, 3 and 4, each traction blade 14 can be molded as a unitary part or can be assembled from a plurality of parts described immediately below. It is to be understood that the assembly can be accomplished by welding or other fastening means such as bolts or rivets. Traction blade 14 comprises a buoyancy blade 18 which can be formed from a strip of steel, for example, 7" wide by ⅜" thick. Buoyancy blade 18 has a central or intermediate portion 20 of which is convex or bridge-like to generally conform to the cross-sectional profile of tire 12. The remaining side portions 22 and 24 project from both sides of intermediate portion 20. The side portion which projects away from vehicle 10 can of course project furthest without interfering with the vehicle's normal operation. In this embodiment, side portion 22 is the longer portion and provides most of the improved buoyancy. It will be understood that to provide noticeably improved buoyancy and traction to the vehicle when travelling over very soft and muddy terrain, the total length of buoyancy blade 18 will require to be distinctly greater than the width of tire 12. It has been observed that a buoyancy blade 18 of a length at least twenty percent greater than the width of tire 12 would be sufficient to provide noticeably improved buoyancy and traction. Those skilled in the art will readily understand that the length and shape of buoyancy blade 18 can be varied at will while remaining within the spirit of the present invention. For example, as is shown in FIG. 6, the length of buoyancy blade 18 can be increased (as shown in dotted lines) to suit particularly swampy terrain. The lengthening can be accomplish by replacement of buoyancy blade 18 or by fastening a lengthening member thereto such as by welding, bolting or riveting.

The other components of traction blade 14 will now be described. Firstly, buoyancy blade 18 is also provided with traction and structural strength enhancements. Blade 18 is provided with a central elongate rib 26 which is orthogonal to the flat portions 20, 22 and 24 of blade 18. The role of rib 26 is of course akin to that of tread design or cleats on a pneumatic tire, i.e. to provide traction in loose, soft, muddy or wet terrain. Rib 26 also confers the additional benefit of providing additional structural strength to blade 18. Rib 26 can be made from a strip of steel, for example, ⅜" thick, welded to the flat portion of blade 18 or otherwise fastened. It will be understood by those skilled in the art that the precise placement or number of ribs similar to rib 26 is not critical to the present invention.

Also provided on blade 18 is a cross rib 28 fastened to or molded integral with rib 26. The role of cross rib 28 is to enhance traction by preventing side to side slippage of the wheels of the vehicle. This is especially important when the vehicle travels sideways on muddy inclined terrain. Cross rib 28 also confers the additional benefit of providing increased structural strength to longitudinal rib 26.

Also provided on traction blade 14 are a pair of rigid tire side walls guides 32 to snugly position and maintain traction blade 14 on tire 12 and to prevent damage to tire 12 during operation of the vehicle 10. These tire side walls guides 32 can be fastened to or molded integrally to boyancy blade 18.

Also provided on traction blade 14 are a pair of rigid link elements 34 forming a loop below and on each extremity of cradle member 30. These link elements 34 can be fastened to or molded integrally buoyancy blade 18. These link elements 34 can also be interconnected with other similar link elements to form an endless track 16 around tire 12. The interconnection mechanism will be described immediately below by reference to FIGS. 1, 2, 5 and 6.

Referring to FIG. 2, link elements 34 are shown interconnected in a straight chain 36 around the periphery of tire 12. Another similar chain 36' is found on the opposite side (shown in FIG. 1) of tire 12. Referring now to FIGS. 5 and 6, a preferred embodiment of a connection mechanism is shown. Link elements 34 can be joined by a U-shaped member 38 having a pair of legs 40 inserted through link elements to either side of it. The assembly is secured by a flat plate 42, having suitable bores for insertion of legs 40, and by fastening devices such as nuts 44 when the extremities of legs 40 are threaded. Such a connection system is advantageous in that it only allows flexibility of chains 36 and 36' in one direction, namely longitudinal, i.e. in a direction parallel to the axis of rotation of the wheels of vehicle 10.

This minimizes displacement of traction blades 14 on tire 12 even during operation of vehicle 10 on very difficult terrain. Moreover, the connection system is easy to assemble and disassemble. However, it will be readily understood by those skilled in the art that the connection system may be varied without departing from the spirit of the present invention. For example, instead of a U-shaped member and a flat plate, there could be used a pair of pins and a pair of flat plates. The choice of the U-shaped member is simply thought to facilitate assembly of the connection by minimizing the number of parts involved. Also, instead of bolts, other fastening means such as a snap fit or a weld could be used.

During installation of the track device 16 over a tire 12, the tire is partially deflated, traction blades 14 are interconnected in an endless loop as close as possible to tire 12. The tire is then reinflated to very snugly fit against the track device 16. The same steps are followed in reverse to remove the track device 16.

Turning now to FIGS. 7, 8 and 9, there is shown a most preferred embodiment of the track device 16. The track device 16 is similar in many respects to the above-described embodiment. Therefore, like elements are identified by like reference numbers. However, in this embodiment, buoyancy blade 46 is wider than buoyancy blade 18 and is provided with two elongate side ribs 48 which upwardly project from the sides of buoyancy blade 46. The obvious role of the ribs 48 is of course to enhance traction over very soft terrain and to strengthen blade 46. However, it is to be noted that it also increases the buoyancy of blade 46 because it cups and channels very damp or muddy soil towards the extremities of blade 46. Furthermore, because each buoyancy blade 46 is wider, they are more closely spaced-apart on track 16. These differences combine to minimize sinking of blade 46 is swampy terrain.

The details of construction of blade 46 will now be described. Firstly, blade 46 is structured around a supporting cradle member 50 adapted to transversely cradle tire 12 below it. Cradle member 50 is appropriately shaped so that it will rest snugly on tire 12. Ribs 48 constitute portions of cradle member 50 which longitudinally extend beyond the width of tire 12. These ribs 48 enhance the traction of vehicle 10 and from the cupping Flat buoyancy strips 52 and 54 are fastened between the longitudinal extensions of ribs 48 to increase the overall length of blade 46. In such an embodiment, it is particularly easy to vary the lenght of blade 46 by modifying the length of strips 52 and 54.

Although the invention has been described above with respect with one specific form, it will be evident to a person skilled in the art that it may be modified and refined in various ways. It is therefore wished to have it understood that the present invention should not be limited in scope, except by the terms of the following claims.

I claim:

1. A track device for mounting on a pneumatic tire fitted to the wheel of a vehicle to improve the buoyancy and traction of the vehicle over very soft terrain, said pneumatic tire comprising a tread surface across the width of the tire, a pair of side walls and an axis of rotation, said track device comprising:

a plurality of bridge-like longitudinal and rigid traction blades having an inside surface made to rest on said tire across the width of said tread surface and a ground engaging outside surface, said traction blades being disposed on said tire in generally closely spaced-apart and parallel relationship to form an endless track;

each said traction blade comprising: an intermediate bridge-like portion made to conform to the general cross-sectional shape of the tire, essentially flat side portions outwardly projecting from either side of said intermediate portion and generally parallel to the axis of rotation of said tire, said sides portions sufficiently projecting beyond the width of said tire so as to provide a widening of said wheel of at least twenty percent of the width of said tire, thereby increasing the buoyancy and traction of said vehicle over very soft and muddy terrain, on its inside surface, side members, integral with said traction blade and adapted to rest against the side walls of said tire so as to maintain said traction blade positioned over said tire, at least one longitudinal rib element integral with said traction blade and outwardly projecting from said outer surface of said traction blade so as to provide additional traction to said track device and additional strength to said traction blade;

link elements for interconnecting said traction blades so that the traction blades form a tight track around said tire, said link elements comprising:

a U-shaped member having a intermediate portion and two leg portions, said U-shaped member being adapted to link adjacent traction blades by insertion of each leg portion of said U-shaped member into a corresponding apertured member integral with said inside surface of said traction blade, a longitudinal flat member having bores in each longitudinal end adapted to receive therethru said leg portions of said U-shaped member, fastening means to fasten said longitudinal flat member to said leg portions of said U-shaped member.

2. A track device for mounting on a pneumatic tire fitted to the wheel of a vehicle to improve the buoyancy and traction of the vehicle over very soft terrain, said pneumatic tire comprising a tread surface across the width of the tire, a pair of side walls and an axis of rotation, said track device comprising:

a plurality of bridge-like longitudinal and rigid traction blades having an inside surface made to rest on said tire across the width of said tread surface and a ground engaging outside surface, said traction blades being disposed on said tire in generally closely spaced-apart and parallel relationship to form an endless track;

each said traction blade comprising:

an intermediate bridge-like portion made to conform to the general cross-sectional shape of the tire, essentially flat side portions outwardly projecting from either side of said intermediate portion and generally parallel to the axis of rotation of said tire, said side portions sufficiently projecting beyond the width of said tire so as to provide a widening of said wheel of at least twenty percent of the width of said tire, thereby increasing the buoyancy and traction of said vehicle over very soft and muddy terrain, on its inside surface, side members, integral with said traction blade and adapted to rest against the side walls of said tire so as to maintain said traction blade positioned over said tire;

linking means including a plurality of link elements for interconnecting said traction blades so that the traction blades form a tight track around said tire; each of said link elements comprising a U-shaped member having an intermediate portion and two leg portions, said U-shaped member being adapted to link adjacent traction blades by insertion of each leg portion of said U-shaped member into a corresponding apertured member integral with said inside surface of said traction blade, a longitudinal flat member having bores in each longitudinal end adapted to receive therethrough said leg portions of said U-shaped member, fastening means to fasten said longitudinal flat member to said leg portions of said U-shaped member.

3. A track device as in claim 2 wherein said leg portions have threaded extremities and said fastening means is a bolt.

4. A track device as in claim 2 wherein fastening means is a weld.

5. A track device for mounting on a pneumatic tire fitted to the wheel of a vehicle to improve the buoyancy and traction of the vehicle over very soft terrain, said pneumatic tire comprising a tread surface across the width of the tire, a pair of side walls and an axis of rotation, said track device comprising:

a plurality of bridge-like longitudinal and rigid traction blades having an inside surface made to rest on said tire across the width of said tread surface and a ground engaging outside surface, said traction blades being disposed on said tire in generally closely spaced-apart and parallel relationship to form an endless track;

each said traction blade comprising:

an intermediate bridge-like portion made to conform to the general cross-sectional shape of the tire, essentially flat side portions outwardly projecting from either side of said intermediate portion and generally parallel to the axis of rotation of said tire, said side portions sufficiently projecting beyond the width of said tire so as to provide a widening of said wheel of at least twenty percent of the width of said tire, thereby increasing the buoyancy and traction of said vehicle over very soft and muddy terrain, on its inside surface, side members, integral with said traction blade and adapted to rest against the side walls of said tire so as to maintain said traction blade positioned over said tire;

linking means including a plurality of link elements for interconnecting said traction blades so that the traction blades form a tight track around said tire; each of said link elements comprising a deformable, generally U-shaped member having a midportion and two leg portions having outwardly flared extremities, said generally U-shaped member being adapted to link adjacent traction blades by snap fit insertion of each said extremity of said leg portions of said U-shaped member into a corresponding apertured member integral with said inside surface of said traction blade.

\* \* \* \* \*